(12) United States Patent
Fernandez

(10) Patent No.: US 11,524,799 B2
(45) Date of Patent: Dec. 13, 2022

(54) AEROSPACE-GRADE SENSOR REPLACEMENT METHOD

(71) Applicant: Rangel Fernandez, Doral, FL (US)

(72) Inventor: Rangel Fernandez, Doral, FL (US)

(73) Assignees: Rangel Fernandez, Doral, FL (US), PART INTEREST; Maria Andrea Fernandez, Doral, FL (US), PART INTEREST ( * ) Notice: Subject to any disclaimer, the term of this patent is extended or adjusted under 35 U.S.C. 154(b) by 716 days.

(21) Appl. No.: 16/535,937

(22) Filed: Aug. 8, 2019

(65) Prior Publication Data
US 2020/0047920 A1 Feb. 13, 2020

Related U.S. Application Data

(60) Provisional application No. 62/715,918, filed on Aug. 8, 2018.

(51) Int. Cl.
*G01J 5/10* (2006.01)
*B64F 5/40* (2017.01)
(Continued)

(52) U.S. Cl.
CPC .............. *B64F 5/40* (2017.01); *B64C 1/1492* (2013.01); *B64D 15/12* (2013.01); *B64F 5/60* (2017.01);
(Continued)

(58) Field of Classification Search
CPC .............................. G01N 25/72; G01N 25/00; B64F 5/40; B64F 5/60; B64D 15/12; B64C 1/1492;
(Continued)

(56) References Cited

U.S. PATENT DOCUMENTS 4,780,162 A    10/1988   Forler et al.
5,049,217 A *   9/1991   Forler ................... B29C 73/025
                                                  425/13
(Continued)

FOREIGN PATENT DOCUMENTS

CA         2878950 A1 *  2/2014  ............... B64C 1/14
CN       202147656 U  *  2/2012
(Continued)

*Primary Examiner* — Gail Kaplan Verbitsky
(74) *Attorney, Agent, or Firm* — Malloy & Malloy, P.L.; Robert M. Downey

(57) ABSTRACT

A method for installing a replacement electrical heat sensor in a heatable aircraft window laminate structure comprising the steps of: drilling a blind hole in the edge of the window laminate; routing a channel in the edge of the window laminate from the blind hole to a terminal block of an originally installed heat sensor; inserting the replacement heat sensor into the hole; filling the hole with a material to seal the hole and the heat sensor from contamination; heating the window laminate; photographing the window laminate using an infrared camera to determine uniformity of heat distribution; placing a heated plate against the exterior surface of the window laminate directly over the position of the replacement heat sensor; measuring an electrical resistance of the replacement heat sensor to confirm proper operation of the replacement heat sensor.

1 Claim, 1 Drawing Sheet

(51) Int. Cl.
*G01K 15/00* (2006.01)
*B64D 15/12* (2006.01)
*B64C 1/14* (2006.01)
*B64F 5/60* (2017.01)
*B64C 1/00* (2006.01)
*G01J 5/00* (2022.01)

(52) U.S. Cl.
CPC .............. *G01J 5/10* (2013.01); *G01K 15/007* (2013.01); *B64C 2001/0054* (2013.01); *G01J 2005/0077* (2013.01)

(58) Field of Classification Search
CPC .............. B64C 2001/0054; G01K 5/10; G01K 15/007; G01J 2005/0077
See application file for complete search history.

(56) References Cited

U.S. PATENT DOCUMENTS

| | | | |
|---|---|---|---|
| 5,582,485 A * | 12/1996 | Lesniak | G01N 25/72 374/5 |
| 7,083,327 B1 * | 8/2006 | Shepard | G01N 25/72 374/57 |
| 8,577,120 B1 * | 11/2013 | Koshti | G06T 7/0004 250/341.8 |
| 2018/0024007 A1 * | 1/2018 | Holmes | G06T 7/0004 250/330 |
| 2022/0134714 A1 * | 5/2022 | Nohara | B32B 17/10 428/426 |

FOREIGN PATENT DOCUMENTS

| | | | | |
|---|---|---|---|---|
| EP | 3955702 A1 * | 2/2022 | ....... | B32B 17/10036 |
| GB | 2237113 A * | 4/1991 | ............ | G01N 25/72 |
| JP | S6241132 B2 * | 9/1987 | | |
| JP | 2000289451 A * | 10/2000 | | |
| KR | 920004492 B1 * | 2/1992 | | |
| RU | 2738173 C1 * | 12/2020 | ....... | B32B 17/10036 |
| WO | WO-2016133612 A1 * | 8/2016 | .......... | B64C 1/1476 |

* cited by examiner

ID SENSOR

AEROSPACE-GRADE SENSOR REPLACEMENT METHOD

This patent application is based on provisional patent application Ser. No. 62/715,918 filed on Aug. 8, 2018.

BACKGROUND OF THE INVENTION

Field of the Invention

The invention relates to a method for replacing an electrical heat sensor in an aircraft window laminate structure comprising two or more plies of glass and/or acrylic and at least one electrically conductive ply between the glass and/or acrylic plies. More particularly, the invention relates to methods for repairing and/or replacing heat control sensors in aircraft window laminates.

Discussion of the Related Art

Aircraft windows typically comprise two to five plies of glass and/or acrylic material which are bound together by interposed polyvinyl adhesive plies. A scratch resistant ply, such as glass, is typically affixed to the opposing sides of the laminate window structure and affixed by opposing sides of the polyvinyl interposed adhesive plies. In many instances, an electrically conductive ply is meshed between the outer glass scratch resistance ply and the next adjacent ply to enable electrical current flow therethrough to heat the window to a particular temperature as determined by a heat control sensor, thereby preventing ice formation on the window during flight.

One disadvantage of aircraft window laminates is the usual failure of the heat control sensor which controls the amount of power flowing to the electrically conductive ply. Since the heat sensor is embedded in the laminate, the failure of the heat sensor usually results in discarding the entire window laminate. Naturally, this is costly to the aircraft owner.

Accordingly, there is a need for a method for replacing a defective heat control sensor in aircraft window laminates. An example of a known method of replacing a defective heat sensor in an aircraft window laminate is disclosed in U.S. Pat. No. 5,049,217 to Forler, the contents of which are incorporated herein by reference.

SUMMARY OF THE INVENTION

The present invention is directed to a method for electrical sensor repair in aircraft window transparency laminates. The method includes steps for determining whether the electrical heat sensor is defective by first photographing the window laminate using an infrared camera to determine heat conformity throughout the window laminate. Next, a heated aluminum plate is placed against the pane of the window laminate, directly over the sensor and an ohmmeter is connected across the heat sensor terminals to observe an increase in sensor resistance. If the resistance increases to infinity, the sensor is defective. If the resistance stays within the manufacturing limits, the sensor is in operative condition. If the sensor is determined to be defective, the method further includes drilling, routing and encapsulating techniques described herein. In short, the entire process is accomplished by drilling a blind hole in an edge of the laminate, inserting a reversed engineered sensor into the hole and filling/sealing it free from contamination.

OBJECTS AND ADVANTAGES OF THE PRESENT INVENTION

Considering the forgoing, it is a primary object of the present invention to provide a method for repairing aircraft transparency laminates without adversely affecting the electrical heating ply position between the transparency laminate.

It is a further object of the present invention to provide a method for installing a new heat control sensor to substitute the original, defective heat control sensor of an aircraft transparency laminate.

It is still a further object of the present invention to provide a method for determining whether an electrical heat control sensor is defective in an aircraft transparency window laminate.

These and other objects and advantages of the present invention are more readily apparent with reference to the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
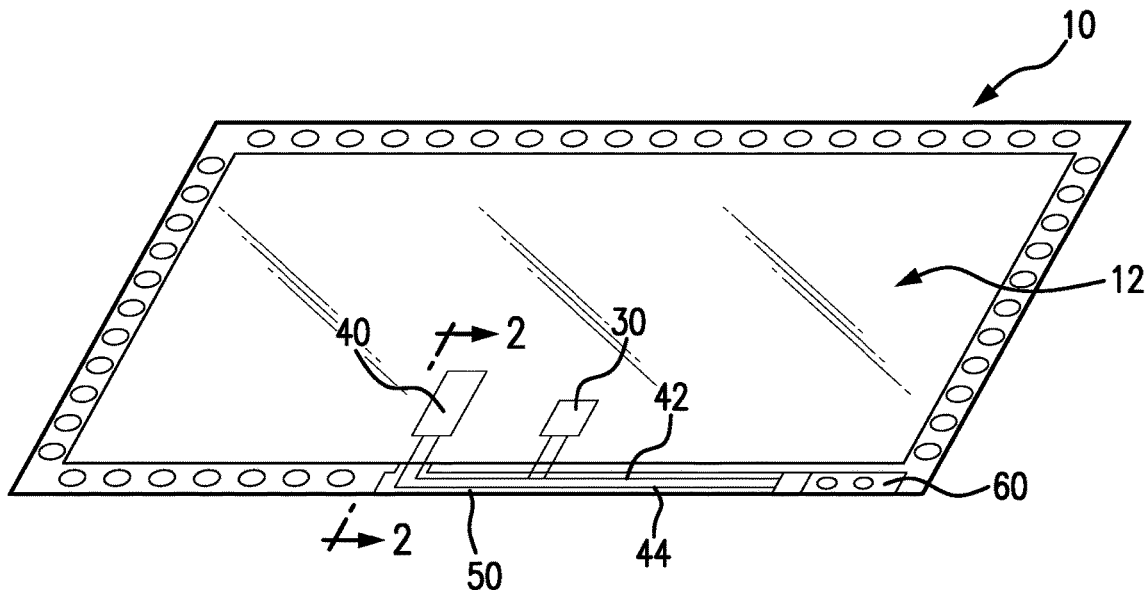
FIG. 1 is a perspective view of an aircraft window showing electrical sensors positioned therein in relation to a bus bar.
Figure 2:
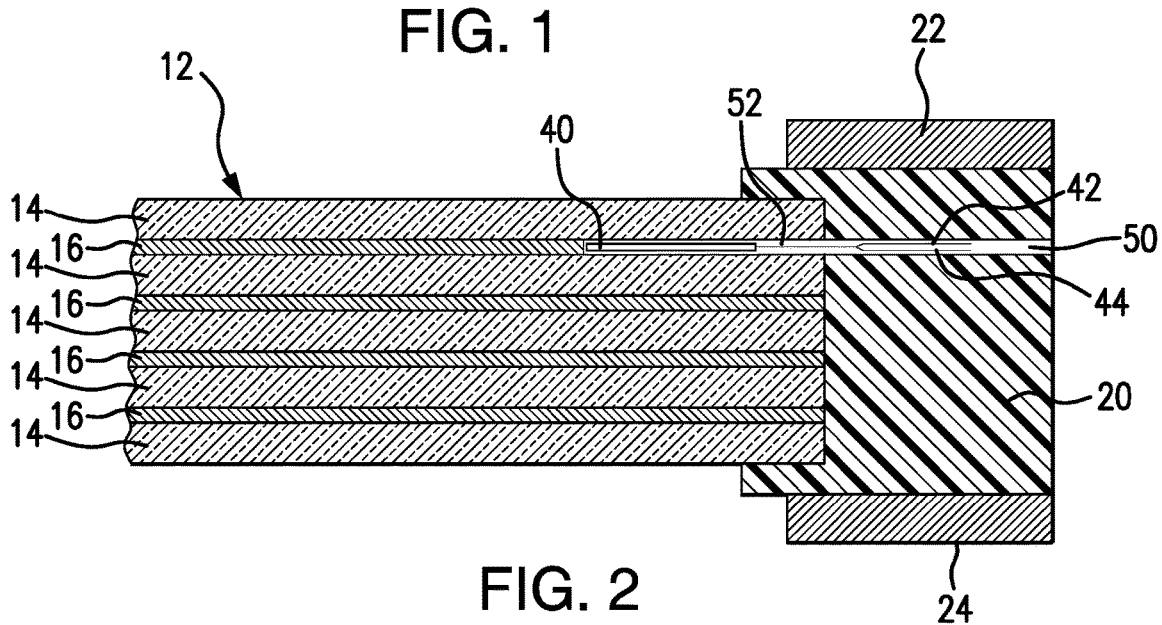
FIG. 2 is a partial cross-sectional view of the aircraft window laminate showing the position of the original OEM sensor and a replacement sensor installed within the laminate in accordance with the method of the invention.

Referring to FIGS. 1 and 2, a typical aircraft window 10 comprises a transparent laminate structure 12 having several glass and/or acrylic plies 14 that are adhered together by means of interposed polyvinyl adhesive plies 16. At least one of these plies 16 and preferably the ply closest to the outermost glass/acrylic ply 14 of the window laminate structure, is structured to be electrically resistive such that when electrical energy is applied thereto, the outer glass/acrylic ply 14 providing the outer window surface is heated to a temperature that is sufficient to prevent ice formation about the entire exterior surface of the aircraft window 10.

A seal member 20 is positioned about and overlaps the peripheral edge of the laminate 12. A pull of opposing frame members 22 and 24 are positioned about opposing sides of the seal member 20 in order to provide rigidity thereto.

The method of the present invention includes steps directed towards determining whether the original (OEM) heat sensor 30 is defective, or if a replacement heat sensor 40 is defective. The method of determining whether either of these heat sensors 30, 40 are defective includes the steps of first heating the window laminate structure 12, then photographing the window laminate structure 12 using an infrared camera to determine uniformity of heat distribution throughout the entire window laminate structure 12. Next, a heated aluminum plate is placed against the exterior surface of the outermost window ply 14, directly over the sensor (either sensor 30 or sensor 40) and an ohmmeter is connected across the heat sensor terminals to observe an increase in sensor resistance. If the resistance increases to infinity, the sensor is defective. If the resistance stays within the manufacturing limits, the sensor is in operative condition. If the sensor is determined to be defective, the method of the present invention further includes replacement of the electrical sensor.

The electrical sensor repair method of the invention comprises steps for installing a new heat sensor 40 in substitution for the original OEM heat sensor 30. The steps of the method of the present invention are as follows:

Once the sensor location has been established, drill a hole 52 using a 1/16th bit attached to a hand drill.

Drill no more than 1 inch at a time and retract drill for cooling. This prevents the interlayered vinyl 16 from melting.

The hole 52 should be perpendicular to the window edge and parallel to the glass.

The depth of the hole should be the same as the inner edge of the original sensor.

Using a Dremel router bit #650-1/8th of an inch and starting at the drilled hole, make a channel 50 measuring 1/16th of an inch to 1/2 of an inch deep along the most convenient path on the window edge, until terminal block 60 of the original sensor 30 is reached. See FIG. 2

Figure 3:
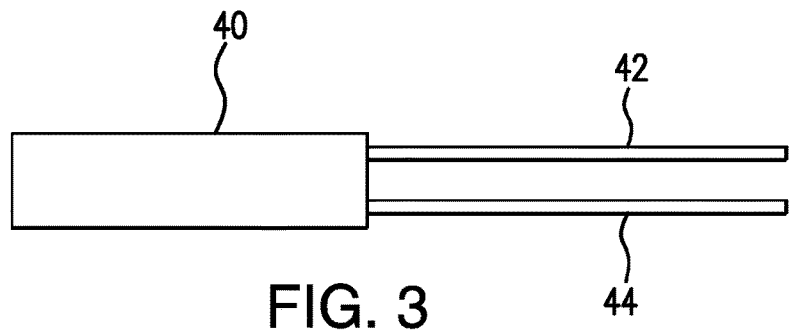
FIG. 3 is side elevational view of a replacement sensor for use in conjunction with the method of the present invention.

Using the reversed engineered sensor 40 from an approved vendor, (as per the engineering orders) See FIG. 3. Insert the sensor 40 all the way to the bottom of the drilled hole 52.

Imbed its two twisted lead wires 42, 44 in the routed channel 50.

Note: Measure the sensor resistance as per OEM specifications PRIOR to filling the sensor hole 52 and channel 50.

Fill sensor hole 52 with epoxy.

Fill the routed channel 50 with adequate sealant (PR 1425) or any other approved aerospace sealant that blends well with edge color.

Set to cure for a time as specified by manufacturer.

Heat window using 120 volts or as per OEM specifications depending on the aircraft type.

Photograph the window using an infrared camera to satisfy a heat conformity test.

Final Inspection

Heat a piece of aluminum plate, approximately 1/4-3/8th of an inch-thick×3 inches square.

Submerge into water set at 200 degrees Fahrenheit (plus or minus 10 degrees Fahrenheit).

Place the plate against the pane of the window directly over the sensor.

Connect the ohmmeter across the sensor terminals and observe increase in sensor resistance.

If the resistance increases to infinity, the sensor is defective.

If it stays within the manufacturing limits, the sensor is in operative condition and the window can be considered serviceable by the designated airworthy authority.

While the present invention has been shown and described in accordance with a preferred and practical embodiment, it is recognized that departures from the instant disclosure are fully contemplated within the spirit and scope of the present invention which is not to be limited except as defined in the following claims as interpreted under the Doctrine of Equivalents.

What is claimed is:

1. A method for installing a replacement electrical heat sensor in a heatable aircraft window laminate structure comprising the steps of:
   heating the aircraft window laminate structure;
   photographing the aircraft window laminate structure using an infrared camera to determine uniformity of heat distribution;
   installing a replacement electrical heat sensor in the aircraft window laminate structure if there is a lack of uniformity of heat distribution;
   the steps of installing the replacement electrical heat sensor including:
      drilling a blind hole in an edge of the aircraft window laminate structure;
      routing a channel in the edge of the aircraft window laminate structure from the blind hole to a terminal block of an originally installed heat sensor;
      inserting the replacement heat sensor into the hole; and
      filling the hole with a material to seal the hole and the replacement heat sensor from exposure to moisture and contamination;
   heating the aircraft window laminate structure after installing the replacement electrical heat sensor in the aircraft window laminate structure;
   photographing the aircraft window laminate structure using an infrared camera to determine uniformity of heat distribution;
   placing a heated plate against the exterior surface of the aircraft window laminate structure directly over the position of the replacement heat sensor; and
   measuring an electrical resistance of the replacement heat sensor to confirm proper operation of the replacement heat sensor.

* * * * *